United States Patent
Flessas

(10) Patent No.: US 11,345,017 B2
(45) Date of Patent: May 31, 2022

(54) METHOD AND SYSTEM FOR MOVING CABLE-MOUNTED OBJECTS USING ROBOTIC MOUNTS

(71) Applicant: Andrew Flessas, Columbia, TN (US)

(72) Inventor: Andrew Flessas, Columbia, TN (US)

( * ) Notice: Subject to any disclaimer, the term of this patent is extended or adjusted under 35 U.S.C. 154(b) by 237 days.

(21) Appl. No.: 16/946,234

(22) Filed: Jun. 11, 2020

(65) Prior Publication Data

US 2021/0387326 A1 Dec. 16, 2021

(51) Int. Cl.
| | |
|---|---|
| B25J 9/00 | (2006.01) |
| B25J 5/04 | (2006.01) |
| B25J 15/00 | (2006.01) |
| B25J 5/00 | (2006.01) |
| B25J 9/16 | (2006.01) |
| B25J 19/02 | (2006.01) |

(52) U.S. Cl.
CPC ............... *B25J 5/04* (2013.01); *B25J 5/007* (2013.01); *B25J 9/0084* (2013.01); *B25J 9/1682* (2013.01); *B25J 15/0019* (2013.01); *B25J 19/023* (2013.01)

(58) Field of Classification Search
CPC . G05B 19/402; B25J 5/007; B25J 5/04; B25J 9/0084; B25J 9/1682; B25J 19/023; B25J 15/0019; B25J 13/086; B25J 19/021; B25J 5/00; B25J 11/0055; B25J 9/0087; B25J 15/0616; B25J 9/163; B25J 13/085; H04N 5/23299; E04F 21/22; E04F 21/023; E04F 21/0076; E04F 21/1872; G01B 11/2513; G01B 11/25
See application file for complete search history.

(56) References Cited

U.S. PATENT DOCUMENTS

| | | | |
|---|---|---|---|
| 7,239,106 B2 | 7/2007 | Rodnunsky et al. | |
| 7,545,108 B2 | 6/2009 | Flessas | |
| 8,356,704 B2 | 1/2013 | Flessas | |
| 8,896,242 B2 | 11/2014 | Flessas | |
| 9,410,659 B2 * | 8/2016 | Troy | G01N 29/28 |
| 9,497,431 B2 | 11/2016 | Flessas | |
| 9,794,533 B2 | 10/2017 | Flessas | |
| 9,823,693 B2 | 11/2017 | Flessas | |
| 10,257,479 B2 | 4/2019 | Flessas | |
| 10,486,306 B2 * | 11/2019 | Shibata | B25J 9/1674 |
| 10,684,643 B2 | 6/2020 | Flessas | |

(Continued)

OTHER PUBLICATIONS

Moreira et al., Cable robot for non-standard architecture and construction: A dynamic positioning system, 2015, IEEE, p. 3184-3189 (Year: 2015).*

(Continued)

*Primary Examiner* — Mcdieunel Marc
(74) *Attorney, Agent, or Firm* — Weide & Miller, Ltd.

(57) ABSTRACT

A cable-mounted object, such as a camera, is movable using one or more robotic cable mounts. The robotic cable mounts have a head which support a first portion of the cable. The head is movable in three-dimensional space, such as linearly along three orthogonal axis (or combinations thereof). Changes in the position of the head of the robotic mount change the position of the cable, thus changing the position of the cable-mounted object. In one embodiment, two ends of cable may be connected to first and second robotic cable mounts, or an object might be mounted to multiple cables, each of which is connected to a different robotic mount.

17 Claims, 5 Drawing Sheets

(56) References Cited

U.S. PATENT DOCUMENTS

| | | | |
|---|---|---|---|
| 2006/0049159 A1* | 3/2006 | Nihei | B25J 9/0018 |
| | | | 219/136 |
| 2007/0152141 A1 | 7/2007 | Rodnunsky | |
| 2009/0207250 A1 | 8/2009 | Bennett et al. | |
| 2018/0169854 A1* | 6/2018 | Shiratsuchi | B25J 9/042 |
| 2019/0238806 A1 | 8/2019 | Flessas | |
| 2019/0394431 A1 | 12/2019 | Flessas | |
| 2020/0024853 A1* | 1/2020 | Furrer | B25J 19/021 |

OTHER PUBLICATIONS

Cho et al., Inspection Robot for Hanger Cable of Suspension Bridge: Mechanism Design and Analysis, 2013, IEEE, p. 1665-1674 (Year: 2013).*

Bosscher et al., A stability measure for underconstrained cable-driven robots, 2004, IEEE, p. 4943-4949 (Year: 2004).*

Haghighipanah et al., Unscented Kalman Filter and 3D vision to improve cable driven surgical robot joint angle estimation, 2016, IEEE, p. 4135-4142 (Year: 2016).*

* cited by examiner

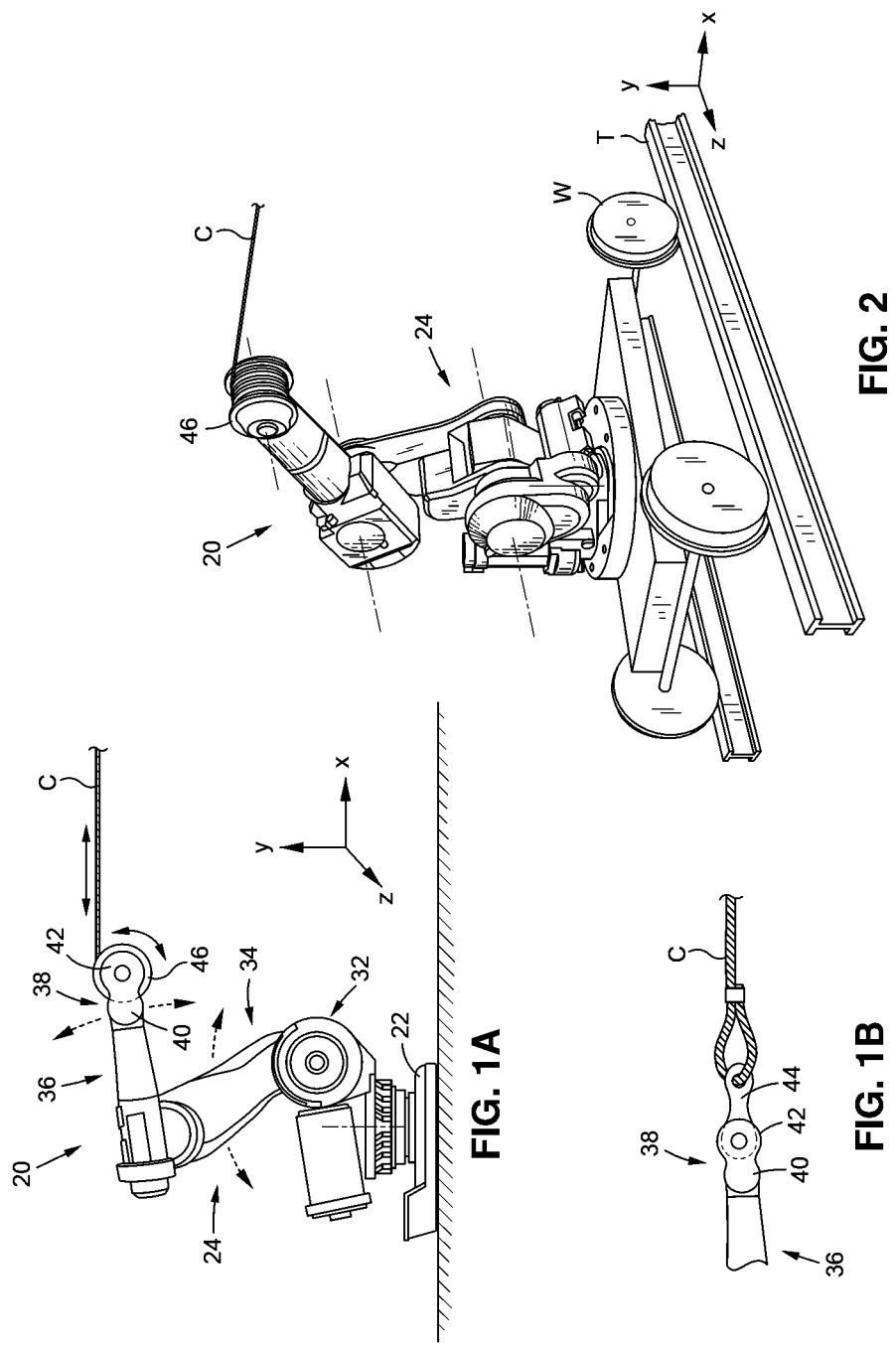

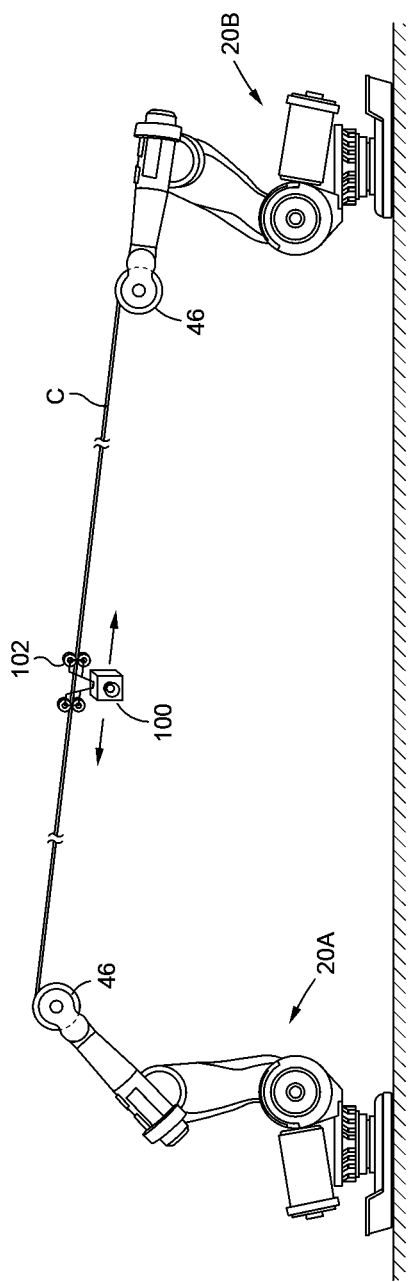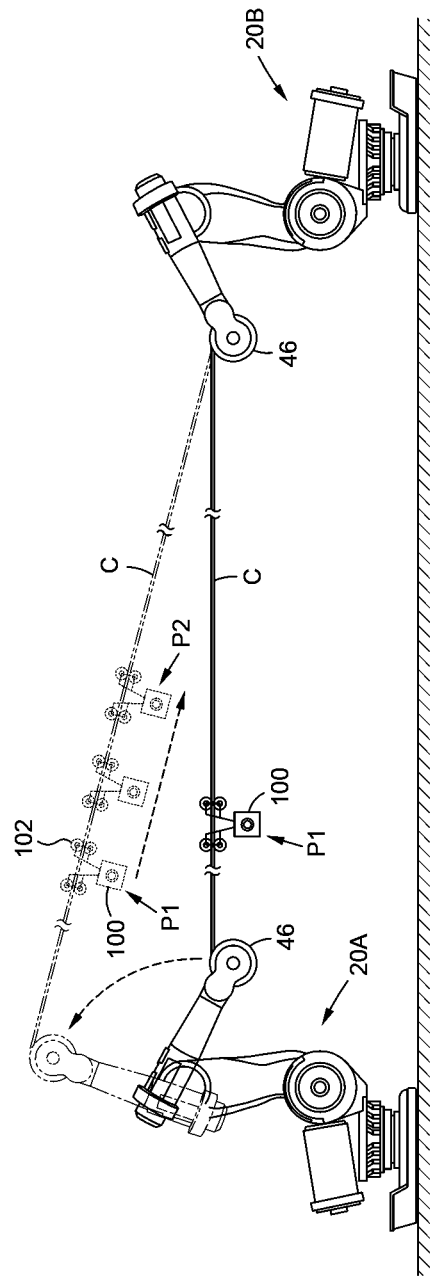

METHOD AND SYSTEM FOR MOVING CABLE-MOUNTED OBJECTS USING ROBOTIC MOUNTS

FIELD OF THE INVENTION

The present invention relates to the movement of cable mounted objects.

BACKGROUND OF THE INVENTION

In entertainment and other venues, it is often desirable to move objects. For example, in a theatrical production, large props may be located on a stage. The props may be moved into various positions to create different scenes and various actions. The props are often moved manually, such as with ropes and pulleys, limiting the situations where they may be used or their effectiveness.

Similarly, when filming a show or movie, a camera may need to be moved to various locations. The camera might be mounted on a dolly, boom or the like, again limiting control over the movement of the camera.

SUMMARY OF THE INVENTION

The invention comprises methods and devices for moving a cable-mounted object, such as a camera.

One embodiment of the invention is a method of moving a cable-mounted object by changing the position of a cable to which the object is mounted. The position of the cable may be changed by changing the position of a portion of a robotic cable mount which supports the cable, such as a head. In one embodiment, different portions of a cable, such as opposing ends, may be supported by different robotic cable mounts, whereby changes in the position of each or both mounts may be used to change the position of the cable and thus the cable-mounted object. In other embodiments, a cable-mounted object might be connected to multiple cables and opposing ends or portions of each cable may be supported by a different robotic cable mount.

In one embodiment, a controller is used to control the robotic cable mounts, such as by controlling one or more motors which move the mounts, thus controlling the position of the one or more cables and thus the one or more cable-mounted objects.

The cable-mounted objects may be fixedly mounted to the one or more cables, or might be movable relative to the cable(s), such as by being rollably or slidably mounted to the cable.

In one embodiment, the position of the cable-mounted object may be changed by changing the orientation of the cable, such as by tilting it or making it level. In other embodiments, the position of the object might be changed by raising or lowering the entire cable, or otherwise moving the cable without changing its orientation. In yet other embodiments, the position of the object may be changed by changing and effective length of the cable, such as by having ends of the cables mounted on spools of the robotic cable mounts.

Further objects, features, and advantages of the present invention over the prior art will become apparent from the detailed description of the drawings which follows, when considered with the attached figures.

DESCRIPTION OF THE DRAWINGS

FIG. 1A illustrates a robotic cable mount in accordance with an embodiment of the invention;

FIG. 1B illustrates a variant of the robotic cable mount of FIG. 1A;

FIG. 2 illustrates another embodiment of a robotic cable mount in accordance with the invention;

FIGS. 3-5 illustrate aspects of using two robotic cable mounts to control the position of a cable mounted object;

DETAILED DESCRIPTION OF THE INVENTION

Figure 5:
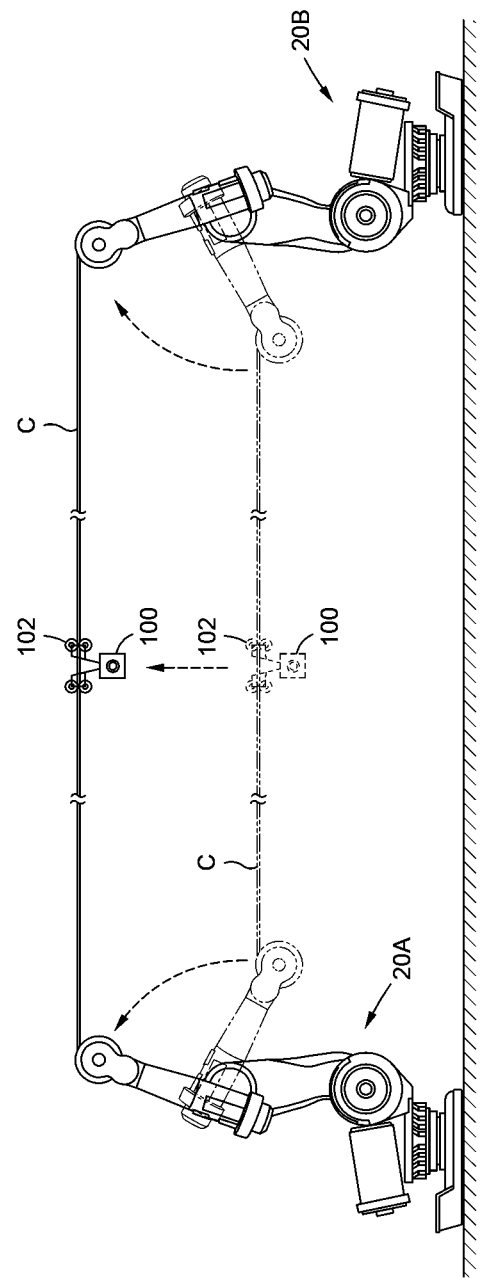

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises one or more robotically-controlled objects and objects which are moved by one or more robots. In a preferred embodiment, the invention comprises a method and system for moving a cable-mounted object, such as a camera.

FIG. 1 illustrates a robot in accordance with an embodiment of the invention, where the robot is configured to move a cable C and may thus be referred to as a robotic cable mount. As illustrated, the robotic cable mount 20 is moveable, thus permitting the position of the cable C to be changed. As detailed below, in a preferred embodiment, the robotic cable mount 20 can be used to change the position of the cable C freely in three-dimensional space.

In a preferred embodiment, the robot cable mount 20 is referred to as "robotic" because it is a device which can change positions in an automated fashion. In particular, the robotic cable mount 20 is preferably capable of multiple movements without manual intervention (i.e. can move between various positions based upon a sequence of instructions without each movement being prompted by individual user input).

Preferably, the robotic cable mount 20 comprises a robot which is movable so that the cable C (or at least one end or portion thereof) is linearly moveable in three (3) directions or along three (3) axis which are orthogonal to one another, and/or in combinations of those directions. For example, as illustrated in FIG. 1, the robotic cable mount 20 may be configured to move a cable C linearly in an "x" direction, a "y" direction and a "z" direction, as well as combinations thereof (e.g. in a direction which is in both an x and y direction, y and z direction, etc.), whereby the robotic cable mount 20 is capable of moving at least a portion of the cable C freely in three-dimensional space. Further, the robotic cable mount 20 may be capable of rotational movement about one or more of such axis.

FIG. 1 illustrates one embodiment of a robot or robotic cable mount 20. In one embodiment, the robotic cable mount 20 comprises a base 22 and a movable cable support 24. The base 22 is configured to support the movable cable support 24, and the movable cable support 24 is preferably moveable relative to the base 22, thus permitting an associated cable C to be moveable.

Referring to FIG. 1, the base 22 may have a variety of configurations, including various shapes and sizes. In general, the base 22 is configured to be mounted to or supported by (by connection or merely resting or setting upon) a support surface, such as a wall, floor or other support, such as a portion of another object. The base 22 may have a generally planar bottom or lower surface for engaging a generally planar support surface, or may have other configurations for engaging support surfaces of other shapes. In one embodiment, the base 22 may include one or more apertures for accepting fasteners which are placed into engagement with the support surface, for securing the base 22 in a fixed position by temporarily or permanently connecting the base 22 to that surface. As described below, however, the entire robotic cable mount 20 may be movable, such as by having a base which is movable relative to a support surface, including by rolling or walking. In the embodiment illustrated, the robotic cable mount 20 is located on a horizontal supporting surface, but it could be mounted upside down, to a vertically extending support, etc.

In a preferred embodiment, a moveable cable support 24 is positioned between the base 22 and the cable C. This support is preferably moveable in at least three (3), and preferably six (6) degrees of freedom, and is thus moveable in at least two (2), and more preferably three (3), dimensions or dimensional space. As indicated above, in a preferred embodiment, movement is permitted linearly relative to each of three generally orthogonal axis (as well as combinations thereof), as well as rotationally around each axis. As disclosed below, the moveable cable support 24 may permit redundant movement in one or more directions. For example, the movable cable support 24 may include two or more elements which permit it (and thus an object connected thereto, such as a cable C) to be moved in the x, y and/or z direction (three degrees of freedom), and to rotate about the x, y and/or z axis (3 additional degrees of freedom), or various combinations thereof.

As illustrated, in one embodiment, the mount includes a main support 32. In one embodiment, the main support 32 is mounted for rotation relative to the base 22, i.e. about the y-axis as illustrated in FIG. 1. The main support 32 may be mounted, for example, on a bearing supported shaft which is connected to the base 22, or by other means.

In one embodiment, a lower arm 34 is rotatably mounted to the main support 32. As illustrated, the main support 32 has a first portion mounted to the base 22 and a second portion to which the lower arm 34 is mounted. In a preferred embodiment, the lower arm 34 is rotatably mounted to the main support 32 about a shaft or other mount. In the configuration illustrated, the lower arm 34 is mounted for rotation about a z-axis (i.e. an axis which is generally perpendicular to the axis about which the base 30 rotates).

As further illustrated, an upper arm 36 is rotatably mounted to the lower arm 34. In one embodiment, a first or distal portion of the lower arm 34 is mounted to the moveable cable support 32, and the upper arm 36 is mounted to a top or proximal portion of the lower arm 34. In one embodiment, the upper arm 36 is also mounted for rotation about the z-axis.

In one embodiment, a head 38 is located at a distal portion of the upper arm 36. Preferably, the cable C is mounted to the moveable cable support 24 via the head 38. In one embodiment, the head 38 is mounted for rotation relative to the upper arm 36 (and thus the remainder of the moveable cable support 24). In one configuration, a first portion 40 of the head 38 is mounted for rotation about an x-axis relative to the upper arm 36 (i.e., about an axis which is perpendicular to both the y and z axes, and thus about an axis which is generally perpendicular to the axis about which the main support 32 and upper and lower arms 36, 34 rotate).

Further, in the embodiment illustrated, a second portion 42 of the head 38 is mounted for rotation relative to the first portion 40 and the upper arm 36, about the z-axis. As illustrated, the cable C is mounted to the second portion 42 of the head 38.

The various portions of the movable cable support 24 may be connected to one another (and to the base 22) in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the movable cable support 24 might be mounted to one another in other fashions, however, such as by hinged mounting or the like.

Preferably, the movable cable support 24 includes means for moving the one or more portions thereof, and thus the cable C connected thereto. As illustrated, the movable cable support 24 may include one or more motors for moving the components thereof. The motors may be electrical motors. In other embodiments, hydraulics or other means may be utilized to move one or more of the components of the movable cable support 24. For example, a hydraulic arm might be utilized to move the upper arm 36 relative to the lower arm 34 in an up and down direction.

Of course, the robotic cable mount 20 might have various other configurations. For example, while the robotic cable mount 20 described above is redundant in its capacity to move in certain directions (i.e. the upper and lower arms 36, 34 are both configured to move about the z-axis and thus redundantly in the x and y directions), the robotic cable mount 20 could be configured in other fashions (such as by having only a single portion configured to move in each direction). It will also be appreciated that the number of members or elements which the robotic cable mount 20 comprises may vary. For example, the robotic cable mount 20 might comprise a base and a head which is mounted to the base, such as via a swivel, permitting the head to be moved in at least two dimensions. Various configurations of members may also be utilized to effect movement in various directions. For example, aside from swivels or the rotating connections of the robotic cable mount illustrated in FIG. 1, members may be configured to telescope, slide or otherwise move linearly (i.e. move along an axis rather than about an axis), or be configured to move along paths other than curved paths. For example, an arm might be rotatably connected to a base, where the arm is telescopic and can thus be extended or retracted.

As another example, the entire robotic cable mount 20 may be movable. For example, as illustrated in FIG. 2, the robotic cable mount 20 might be movable in one or more directions via wheels W (such as on a track T or otherwise, including where the wheels may rotate, thus allowing the mount 20 to rotate or spin), or might be configured to move in one or more directions by walking (such as by including one or more legs). FIG. 2 illustrates a particular configuration where a robotic cable mount 20 is mounted for movement in the "z" direction along a track, thus permitting a wider range of movement of an associated cable C in the "z" direction than would be permitted by movement of just the movable cable support 24 (for example, by rotating the main support 32 into the "z" direction and extending the lower and upper arms 34,36). In such a configuration, movement of the robotic cable mount 20 on the wheels W may be used to facilitate course position adjustment of the cable C, while fine position adjustment may be accomplished using the movable cable support 24 of the robotic cable mount 20.

As indicated, in a preferred embodiment, the robotic cable mount 20 is configured to move the cable C. In one embodiment, the cable C could be directly attached to the movable cable support 24, such as to the second portion 42 of the head 38. In another embodiment, the cable C may be indirectly attached, such as by attaching the cable C to an eyelet 44 or other relatively fixed mount (which is then connected to the head 38) such as illustrated in FIG. 1A, or to a movable support, such as a spool or reel 46 which may rotate or be rotated (such as via a motor), such as illustrated in FIG. 1. In general, however, the robotic cable mount 20 has a portion (such as the head 38 or an element connected thereto) which is moveable in the manner described above (as indicated above, in one embodiment, movement of the various portions of the movable cable support 24 allow the head 38 to be moved in three (3) generally orthogonal directions and combinations thereof, as well as rotationally about those directions) and is thus configured to move an associated portion of a cable C, where that portion may be an end of the cable or, where a portion of the cable is mounted on a spool, a portion distal from the end. In either event, the cable C has an "effective" end at the interface between the cable C and the robotic cable mount 20, and the location of that effective end is preferably movable.

In the embodiment illustrated, a single cable C is connected to a single robotic cable mount 20. In other embodiments, multiple cables might be mounted to a single mount 20.

The cable C may comprise, for example, a woven steel cable. However, while the term "cable" is used, the cable may comprise other cable-like elements, such as a rope, cord, line or the like, including made of materials other than metal.

As described in detail below, a single robotic cable mount 20 may be used to move a cable C, such as by moving one end of the cable and where the other end of the cable is connected to another object or device, such as a fixed mount. However, two or more robotic cable mounts 20 may be used with one another to move one or more cables. For example, two robotic cable mounts 20 may be used to move a single cable C, such as where each end of the cable C is connected to a different robotic cable mount 20. In another example, two or more robotic cable mounts 20 may be used to move different cables, such as where one end of each cable C is connected to a respective robotic cable mount 20 and the opposing end of each cable is mounted to a mount, such as a common mount.

In one embodiment, means may be provided for controlling a single robotic cable mount 20 or a plurality of mounts. In one embodiment, one or more robotic cable mounts 20 may be controlled by a controller. In a preferred embodiment, the controller may comprise or include a computing device. Various instructions may be provided from the controller to the one or more robotic cable mounts 20, causing the robotic cable mounts 20 to move. For example, a user might provide an input to the controller, which input is a request to move an end of a cable C from a first to a second position. The controller may generate one more signals or instructions which are transmitted to the robotic cable mount 20 for causing the mount to so move the cable C. The signal might comprise opening of a switch which allows electricity to flow to one or more motors of the robotic cable mount 20 for a predetermined period time which is necessary for the motor to affect the desired movement. In another embodiment, the signal might comprise an instruction which is received by sub-controller of the mount, which sub-controller then causes the mount to move as desired.

In one embodiment, the controller may be configured to cause a single robotic cable mount 20 or multiple mounts to move in various patterns or other desired directions. The controller may be custom-programmed or might be configured to execute pre-set sequences of movement.

Figure 7:
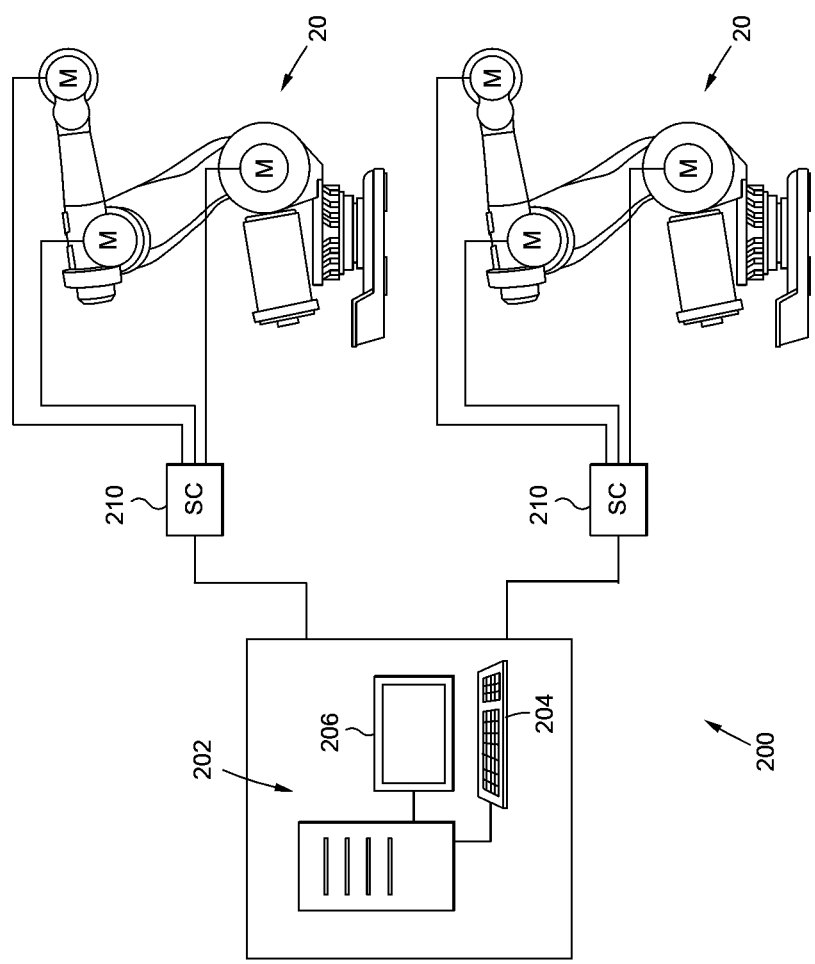
FIG. 7 illustrates a system in accordance with an embodiment of the invention.

FIG. 7 illustrates one embodiment of a control system of the present invention. As illustrated, the system 200 includes a main controller 202. In one embodiment, the main controller 202 may comprise a processor which is capable of executing machine readable code or software, such as stored in a memory in association with the processor. As indicated, that software may comprise a set of instructions which, when executed, cause the controller to move one or more robotic cable mounts 20 to move in a predetermined manner, randomly or otherwise. The software might also or instead simply comprise a set of instructions which permits a user to provide input of desired movement (e.g. which allows the user to "program" the robotic cable mount 20 to move, either in direct response thereto or to generate a programmed movement (which may be implemented immediately or be stored for implementation at a later time).

In one embodiment, the main controller 202 includes one or more user input devices 204, such as a mouse, keyboard, touch-screen or the like, via which the user may provide input. The main controller 202 might generate one or more graphical user interfaces for display on a control display 206 and the user may interact with the interface to provide input (such as by inputting text, clicking boxes, etc.).

In one embodiment, control signals or instructions may that are generated or otherwise output by the main controller 202 may be transmitted to a robotic cable mount sub-controller 210. Such a sub-controller 210 might, for example, be a controller which is located adjacent to the robotic cable mount 20 or within a housing or portion thereof. The sub-controller 210 may process the control instruction and use them to operate the various portions of the robotic cable mount 20, such as one or more motors M. For example, the sub-controller 210 may parse instructions from the main controller 202 so as to individually control each motor M in a manner which effectuates the main control instructions.

The main controller 202 might communicate with each robotic cable mount 20 via wired or wireless communication links. For example, main controller 202 might transmit signals via a RS-232 communication link including a wired pathway to the sub-controller 210 of the robotic cable mount 20. Alternatively, the main controller 202 and the sub-controllers 210 might both include wireless transceivers. In this manner, the main controller 202 may transmit instructions to the robotic cable mounts 20 wirelessly.

Of course, other control configurations are possible. For example, the main controller 202 may comprise a server. One or more users may communicate with the server, such as from user stations (like desktop or laptop computers) or via other devices such as mobile devices including phones or tablets. In one embodiment, the server may be configured as a webserver where users may interface with the server via a web-page. In other configurations, the controller might be a mobile communication device such as an Apple iPhone® which is executing a control application.

Aspects of methods of moving a cable-mounted object will now be described. In one embodiment, one or more objects are mounted to at least one cable, whereby movement of the cable is used to move the one or more objects (e.g. to change their position). In one embodiment, the one or more objects may be mounted in fixed positions on the one or more cables. In other embodiments, the objects may be movably mounted to the cable(s), such as via a mounting which permits them to roll or slide along the cable. One object that may be mounted to a cable and thus moved via movement of a cable, is a camera.

In accordance with the invention, a cable-mounted object is moved using at least one robotic cable mount C.

One embodiment of a method and system will be described with reference to FIGS. 3-5. In one embodiment, a first portion (such as an end) of a cable C may be movable by a first robotic cable mount 20A. A second portion (such as an opposing end) of the cable C may be movable by a second robotic cable mount 20B. In this configuration, movement of the first portion of the cable C by the first robotic cable mount 20A can be used to manipulate the position of the cable C relative to the second portion, and vice versa.

In one embodiment, manipulation of the position of the cable C can be used to change the position of an object associated with the cable C. For example, as illustrated in FIG. 3, a camera 100 or other object might be mounted to the cable C. In one embodiment, the camera 100 might be mounted to the cable C via one or more wheels 102 When the cable C is generally horizontal, the camera 100 will generally remain in a particular position. However, when the position of the cable C is changed, and namely the orientation of the cable, such as by raising or lowering one end relative to another so that the cable C is sloped, the camera C will change positions by rolling downwardly along the cable.

In particular, by either raising the first portion of the cable C using the first robotic cable mount 20A, or by lowering the second portion of the cable C using the second robotic cable mount 20B (or both), the slope of the cable C causes the camera 100 to move along the cable C to the right as illustrated in FIG. 3. This movement may be stopped by changing the positions of one or both robotic cable mounts 20A,B so as to make the cable C generally level. Likewise, the camera 100 may be caused to move in the opposite direction by causing the cable C to tilt in the other direction.

For example, as illustrated in FIG. 4, the camera 100 might be at a first position P1 along the cable C. The position of the cable C may be changed by raising the first portion or end via the first robotic cable mount 20A, thus sloping the cable C downwardly to the right. This would cause the camera 100 to roll along the cable C towards the right, as illustrated (such as from position P1 to a second position, such as P2).

Of course, the position of the camera 100 or other object might be changed in other manners. As illustrated in FIG. 5, the entire cable C may be moved from a first vertical position to a second vertical position (e.g. where the position of the cable C changes, but not its orientation), thus changing the vertical position of the camera 100. For example, in FIG. 5, both the first portion and second portion of the cable C have been raised via the first and second robotic cable mounts 20A,B, thus raising the camera C vertically upwardly.

As another example, positional change of the object, such as the camera 100, may be accomplished by introducing slack into the cable C or removing slack from the cable C. For example, referring to FIG. 3, if the head of the first robotic cable mount 20A is moved towards the second robotic cable mount C (without a change in the length of the cable C), the cable C will slack and the camera 100 will roll downwardly towards the lowest point of the cable.

Similarly, in another embodiment, positional change of the object, such as the camera 100, may be accomplished by the spools 46. In particular, by allowing cable C to reel out from the spool 46 of one or both robotic cable mounts 20, the cable will slack, causing the camera 100 to move downwardly. Of course, if the cable C is slack, then reeling in the cable will cause the object, such as the camera 100, to move upwardly.

Movement of the cable-mounted object may also be implemented by combinations of changing the length of the cable C and changing the position of the cable C, including its orientation, as described herein.

Of course, the camera or other object might be moved upwardly or downwardly (e.g. linearly in the y direction in FIG. 2), to the left or right (e.g. linearly in the x direction in FIG. 2, including by tilting the cable and allowing the object to move along the cable) and even in a forward/reverse direction (e.g. linearly in the z direction in FIG. 2), or combinations thereof (whereby the object is generally movable in three dimensions).

While FIGS. 3-5 illustrate a configuration in which generally opposing portions of the cable C are associated with robotic cable mounts 20A,B, in one embodiment a first portion (such as a first end) of the cable C might be associated with a robotic cable mount 20 and a second portion (such as a second end) might be mounted to another mount, such as a beam, strut, wall, anchor or the like. In this configuration, movement of the first end of the cable C via the single robotic cable mount 20 may be used to control the position of an object, such as a camera 100, even though the range of movement of the cable C, and thus the cable-mounted object(s), may be more limited.

Figure 6:
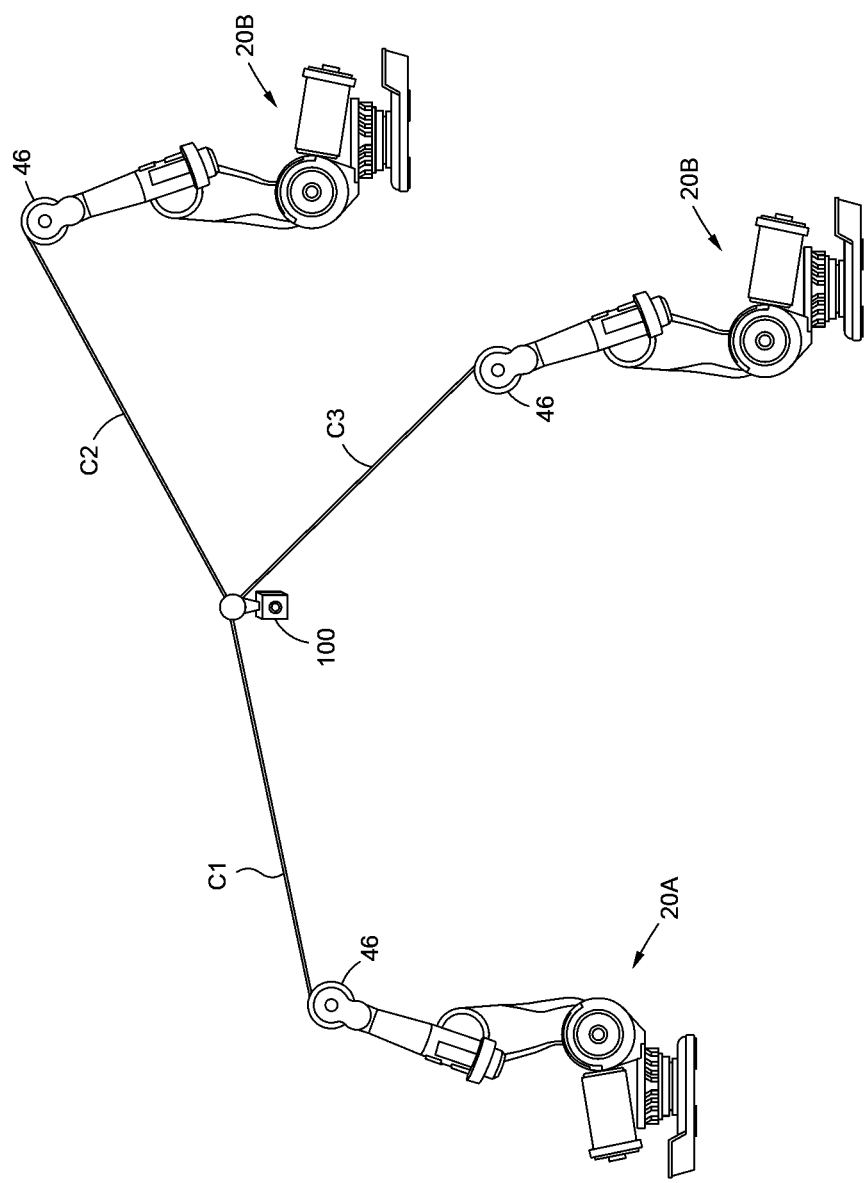
FIG. 6 illustrates use of multiple robotic cable mounts to control the position of an object via multiple cables.

Yet another embodiment of the invention is illustrated in FIG. 6. In this embodiment at least one cable extends between a robotic cable mount and a cable-mounted object, and at least one other cable extends between the object and another mount, such as another robotic cable mount. In the embodiment illustrated, a first cable C1 extends between an object, such as a camera 100, and a first robotic cable mount 20A, a second cable C2 extends between the object and a second robotic cable mount 20B, and a third cable C3 extends between the object and a third robotic cable mount 20C.

In this configuration, the position of the object, such as the camera 100, may be changed by moving any one of the cables C1, C2, C3 via the respective robotic cable mounts 20A,B,C. The object may be moved by changing the position of the robotic cable mount (e.g. the position where the cable leaves the mount) and/or by reeling in or out cable via the spool of the mount, or combinations thereof. Of course, changes in position may be made via combinations of those movements by one, two or all three of the robotic cable mounts 20A,B,C. For example, relative to FIG. 6, if the upper arm 36 of all three robotic cable mounts 20A,B,C, were to be rotated into a lower position, the cables C1,C2, C3, and thus the camera 100, would be moved to a lower vertical position. If cable C1 were reeled in by the spool 46 of the first robotic cable mount 20A at the same time as cables C2 and C3 are reeled out by the spools 46 of the second and third robotic cable mounts 20B,C, then the camera 100 would move towards the left in FIG. 6 (e.g. towards the first robotic cable mount 20A).

Of course, a similar configuration where one or more, including less than three or more than three, robotic cable mounts 20 are connected to individual cables which are then connected to other objects, are possible.

As noted above, changes in position of the cable-mounted object(s) are preferably accomplished by one or more robotic cable mounts, wherein movement of each robotic cable mount is effectuated via one or more controllers. In one configuration, this allows the robotic cable mounts to be programmed to be controlled in manner which causes them to move the cable(s) and thus the cable-mounted object(s), in the desired manner. For example, one or more robotic cable mounts may be programmed to move one or more cable-mounted objects along a desired path, in a pattern, etc.

In other embodiments, the robotic cable mounts might be controlled so as to move the cable-mounted object(s) based upon other types of inputs. For example, it may be desired that a camera follow an object which is otherwise moving independently from the camera and the robotic cable mounts. For example, when filming a Western movie, it may be desired to film the face of a rider of a horse as the horse walks along a trail. In one embodiment, information regarding the position of the rider (such as their face) might be provided to the controller of the present invention (such as via a GPS sensor or other device which can provide location information, including relative to the camera, via a camera or "eye" mounted each robotic mount which can see and thus track an object, etc.). The controller (such as the main controller 202 in FIG. 7) may then generate instructions for the one or more robotic cable mounts 20 so as to cause the mounts to move the cable(s), and thus the camera, in sync with the movement of the rider.

Further, the one or more cable-mounted objects might be moved in other manners or for other reasons, such as along a pre-designated path.

A particular advantage of the invention is the ability to use a robotic mount to move one or more cables, and thus one or more cable-mounted or cable supported objects. The invention permits a high degree of control over the movement of such objects due to the granular movement control of the robotic mounts.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of moving a cable-mounted object comprising the steps of:
   supporting a first portion of a cable via a first robotic cable mount which is configured to move said first portion of said cable linearly in three dimensions;
   supporting a second portion of said cable via a second robotic cable mount which is configured to move said second portion of said cable linearly in three dimensions;
   mounting said cable-mounted object to said cable; and
   moving said first robotic cable mount to change a position of said first portion of said cable and/or moving said second robotic cable mount to change a position of said second portion of said cable, whereby a position of said cable-mounted object changes.

2. The method in accordance with claim 1 wherein said first portion of said cable is connected to a rotatable spool of said first robotic cable mount and said step of moving said first robotic cable mount further comprises rotating said rotatable spool.

3. The method in accordance with claim 1 wherein said first robotic cable mount comprises a base and a movable cable support, said movable cable support having a head which moves said first portion of said cable.

4. The method in accordance with claim 3 wherein said head of said movable cable support is movable linearly along each of three orthogonal axis, or combinations thereof.

5. The method in accordance with claim 3 wherein said base is movably supported on a support surface.

6. The method in accordance with claim 5 wherein said base is supported by wheels on a track.

7. The method in accordance with claim 1 wherein said step of moving comprises changing said position of said first portion of said cable so that it is higher than said position of said second portion of said cable.

8. The method in accordance with claim 1 wherein said cable-mounted object is movably mounted to said cable.

9. The method in accordance with claim 8 wherein said cable-mounted object is rollably or slidably mounted to said cable.

10. The method in accordance with claim 1 further comprising changing an effective length of said cable between said first and second robotic cable mounts.

11. A system for changing the position of a cable-mounted object comprising:
    a controller;
    a first robotic cable mount comprising a head which is linearly movable along each of three axis which are orthogonal to one another, or combinations thereof, via actuation of at least one motor;
    a second robotic cable mount comprising a head which is linearly movable along each of three axis which are orthogonal to one another, or combinations thereof, via actuation of at least one motor;
    a cable, said cable having a first portion connected to said head of said first robotic cable mount and a second portion which is connected to said head of said second robotic cable mount; and
    an object mounted to said cable between said first and second portions thereof;
    said controller configured to generate control instructions for causing the actuation of said at least one motor of said first robotic cable mount for moving said head thereof, and thus said first portion of said cable, and for causing the actuation of said at least one motor of said second robotic cable mount for moving said head thereof, and thus said second portion of said cable, in order to change a position of said object.

12. The system in accordance with claim 11 wherein said first portion of said cable is connected to a rotatable spool which is connected to said head of said first robotic cable mount.

13. The system in accordance with claim 11 wherein said first robotic cable mount comprises a base and a movable cable support which is movably mounted to said base and wherein said head comprises a portion of said movable cable support.

14. The system in accordance with claim 13 wherein said base is movably supported on a support surface.

15. The system in accordance with claim 14 wherein said base is supported by wheels on a track.

16. The system in accordance with claim 11 wherein said object mounted to said cable comprises a camera.

17. The system in accordance with claim 16 wherein said camera is movably mounted to said cable.

* * * * *